US012594698B2

(12) United States Patent
Lof et al.

(10) Patent No.: US 12,594,698 B2
(45) Date of Patent: Apr. 7, 2026

(54) MOULD FOR PARTICLE FOAM MOULDING

(71) Applicant: THERMOWARE PARTICLE FOAM MACHINERY B.V., Barneveld (NL)

(72) Inventors: Jacob Lof, Barneveld (NL); Sebastiaan Sarkun Weij, Barneveld (NL); Jacob Hendrik Lodders, Barneveld (NL)

(73) Assignee: Thermoware Particle Foam Machinery B.V., Barneveld (NL)

( * ) Notice: Subject to any disclaimer, the term of this patent is extended or adjusted under 35 U.S.C. 154(b) by 72 days.

(21) Appl. No.: 18/848,808

(22) PCT Filed: Mar. 21, 2023

(86) PCT No.: PCT/EP2023/057228
§ 371 (c)(1),
(2) Date: Sep. 19, 2024

(87) PCT Pub. No.: WO2023/180330
PCT Pub. Date: Sep. 28, 2023

(65) Prior Publication Data
US 2025/0205942 A1     Jun. 26, 2025

(30) Foreign Application Priority Data

Mar. 21, 2022     (NL) ..................................... 2031344

(51) Int. Cl.
*B29C 44/34*          (2006.01)
*B29C 44/02*          (2006.01)
(Continued)

(52) U.S. Cl.
CPC .......... *B29C 44/3426* (2013.01); *B29C 44/02* (2013.01); *B29C 44/58* (2013.01); (Continued)

(58) Field of Classification Search
CPC .... B29C 44/3426; B29C 44/445; B29C 44/58
See application file for complete search history.

(56) References Cited

U.S. PATENT DOCUMENTS

2020/0060383 A1     2/2020  Le et al.

FOREIGN PATENT DOCUMENTS

DE       102019005112 A1     4/2020
FR            2367602 A2     5/1978

OTHER PUBLICATIONS

Netherlands Search Report and Written Opinion dated Nov. 21, 2022, for Netherlands Application No. Nov. 21, 2022.
(Continued)

*Primary Examiner* — James Sanders
(74) *Attorney, Agent, or Firm* — Patterson + Sheridan, LLP

(57)                    ABSTRACT

Mould for particle foam moulding (10), for example dry moulding, comprising: a first mould section (1); a second mould section (2) movable with respect to the first mould section, between: a closed position, in which the first mould section (1) and the second mould section (2) define a cavity (3); a semi-closed position, in which the first mould section (1) and the second mould section (2) are spaced further away from each other than in the closed position for filling the cavity (3); and an open position, in which the first mould section (1) and the second mould section (2) are spaced at a distance (d) from each other to allow removal of a fused particle foam product (98) from the cavity; a filling arrangement (4) to feed foamable particles (99) into the cavity (3) in the semi-closed position; a temperature control system (5) to heat the cavity, wherein the temperature control system comprises at least one injector (51) configured to inject a controlled amount of heating fluid, such as steam, into the cavity (3) for fusing the foamable particles; and a cavity seal (6) between the first mould section (1) and the second mould (Continued)

section (2), comprising an inner seal (61) and an outer seal (62), wherein, in the closed position, the inner seal (61) and the outer seal (62) cooperate to block passage of foamable particles and fluids out of the cavity (3), and in the semi-closed position, the inner seal (61) allows passage of fluids and blocks passage of foamable particles out of the cavity (3).

21 Claims, 4 Drawing Sheets

(51) Int. Cl.
    B29C 44/58         (2006.01)
    B29C 44/60         (2006.01)
    *B29K 105/00*         (2006.01)
    *B29K 105/04*         (2006.01)

(52) U.S. Cl.
    CPC .......... B29C 44/60 (2013.01); *B29K 2105/04* (2013.01); *B29K 2105/251* (2013.01)

(56)               References Cited

OTHER PUBLICATIONS

PCT International Search Report and Written Opinion dated May 31, 2023, for International Application No. PCT/EP2023/057228.

MOULD FOR PARTICLE FOAM MOULDING

FIELD OF THE INVENTION

The invention relates to a mould for particle foam moulding, a particle foam machine, comprising a mould for
particle foam moulding and a method for particle foam
moulding.

BACKGROUND OF THE INVENTION

A foam moulded article is conventionally produced by
filling a mould with foamable beads of a thermoplastic, such
as a polymer. After closing the mould, a relatively large
amount of steam is injected that spreads between the beads
to heat the outer sides of the beads uniformly, such that the
beads thermoplastically fuse with each other.

DE102019005112A discloses a method for producing a
particle foam component from particle foam beads, wherein
the mould parts that define the cavity can be arranged in a
filling position, in which the cavity is filled with beads, and
in a moulding position, wherein the beads are moulded. The
mould parts are pressure tight, and the dimensions of the
cavity in the moulding position are smaller than in the filling
position, such that the beads are compressed in the moulding
position.

JPH02245318A discloses a foam moulding method and
apparatus comprising a steam chamber having two halves in
which a mould cavity is formed by porous walls. The porous
walls are provided with vapour pores or düses through
which steam from the steam chamber may flow into the
mould cavity and past the beads for heating thereof.

In an embodiment, the apparatus comprises backings that
airtightly engage the two halves of the steam chamber. This
way, the mould cavity may be filled under a pressure equal
to or higher than the atmospheric pressure, or under a
vacuum pressure in which the mould cavity is at or below
the atmospheric pressure to improve filling of the mould
cavity.

However, it has been found that filling of the mould cavity
with the foamable beads remains a challenging task, espe-
cially when complex and/or thin-walled mould cavities are
required. The beads may spread unsatisfactory with the
applied pressure and a degree of filling of the mould cavity
may be insufficiently uniform, especially in boundary
regions, thin-walled sections or corners. When an insuffi-
ciently uniform filling degree is achieved, the material
quality of the end product formed from with the fused beads
may be inadequate for practical application.

Further, the mould cavity is preheated with steam before
the filling the mould cavity, and upon closing further steam
is introduced for fusion of the beads. Due to the relatively
large amount of steam required for heating the beads and the
mould cavity, the beads may be relatively moist before,
during and upon fusing. This affects the fusion of the beads
and may reduce surface quality of the final product. Also, the
product may need to be dried actively in an oven before
further processing is possible.

After opening the mould, steam from the mould cavity
and steam chamber evaporates and is lost.

As a result of these factors, the environmental impact of
the known method is relatively high. A relatively large
amount of water and energy is required to generate steam
and heat the mould cavity. Drying and further processing of
the product further increase the energy consumption.

Also, heating the steam chamber and the mould cavity can
take a relatively long time, resulting in a relatively long
cycle time for manufacture of the final product and reducing
production capacity.

Additionally, it has been found that the known methods
for foam moulding do not always yield satisfactory results
with innovative materials, in particular with regards to
achieving an acceptable filling degree, moisture and surface
quality of the final product. The applicant submits that there
is a need for foam moulding of innovative materials, such as
recyclable or biodegradable materials.

OBJECT OF THE INVENTION

It is therefore an object of the present invention to provide
a mould for particle foam moulding which partially over-
comes the disadvantages of the prior art, or at least to
provide an alternative mould for particle foam moulding, for
example a mould that has a lower environmental impact, that
is suited for innovative materials and/or that provides a
higher material quality fused particle foam product, a drier
fused particle foam product and/or a fused particle foam
product having an improved surface quality.

THE PRESENT INVENTION

The present invention provides a mould for particle foam
moulding according to claim 1. The mould comprises two
mould sections, in particular a first mould section and a
second mould section movable with respect to the first
mould section. The mould sections may be horizontally
separated. The first mould section may form a lower section
and the second mould section may form an upper section, or
vice versa. The mould sections may also be separated
vertically or in one or more other directions. The first mould
section and the second mould section may be adapted to
cooperate with each other to form a mould, for example have
complementary shapes.

The mould sections are movable between a closed posi-
tion, in which the first mould section and the second mould
section define a cavity, a semi-closed position, in which the
first mould section and the second mould section are spaced
further away from each other than in the closed position for
filling the cavity; and an open position, in which the first
mould section and the second mould section are spaced at a
distance from each other to allow removal a fused particle
foam product from the cavity. In the open position, a
distance between the mould sections may be larger than in
the semi-closed position. The mould may comprise at least
one actuator configured to move the mould sections.

The closed position may be a fusing position in which the
mould sections are arranged for fusion of particles in the
cavity. The first mould section and/or the second mould
section may comprise a recess closed by the second mould
section, respectively the first mould section, to define the
cavity. The cavity may be arranged partially in the first
mould section and in the second mould section. The cavity
be defined by inner walls of the mould sections that face
each other in the closed position, for example inner walls of
the recess. The cavity may be completely surrounded by the
first mould section and the second mould section in the
closed position. In the closed position, the cavity may be
shaped as a fused particle foam product produced with the
mould. The cavity may however be shaped slightly different
to compensate for shrinking and/or expansion of the fused particle foam product. Foamable particles arranged in the cavity in the closed position may form the fused particle foam product.

The semi-closed position may be a filling position in which the mould sections are configured to allow for filling of the cavity with particles, such as foamable particles. In the semi-closed position, the mould sections may completely surround a filling space. The filling space includes the cavity but may be larger than the cavity in the closed position. Foamable particles may filled in the filling space and thereby spread through the cavity. This way, filling of the cavity may be improved, for example be relatively uniform.

The open position may be a removal position in which the mould sections are configured to allow removal of a foamed particle product from the cavity. A distance between the mould sections in the open position may at least be a width and/or a height of the cavity such that a foamed particle product may be removed upon arranging the mould sections in the open position. Additionally or alternatively, the first mould section and/or the second mould section may comprise detachable sub sections that are movable with respect to each other to allow for removal of a foamed particle product from the cavity.

The mould comprises a filling arrangement to feed foamable particles into the cavity in the semi-closed position. The filling arrangement may be configured to feed foamable beads of a thermoplastic, such as a polymer. The filling arrangement may be fluidly connected with the cavity in the semi-closed position to allow for feeding by means of a fluid flow towards the cavity, such as a pneumatic fluid flow. The filling arrangement may also be fluidly connected with the cavity in the closed position to allow for feeding in the closed position.

The mould comprises a temperature control system to heat the cavity. The temperature control system may be configured to heat inner walls of the first mould section and/or the second mould section. The temperature control system comprises at least one injector configured to inject a controlled amount of heating fluid into the cavity for fusing the foamable particles. The injector may be fluidly connected to the cavity. The injector may be configured to inject heating fluid having a temperature that equal to or higher than a temperature at which the foamable particles become deformable, i.e. mouldable.

The amount of heating fluid is controlled such that the amount may be adapted. For example, the amount may be controlled to inject sufficient heating fluid for fusion, while keeping wetness of the final product relatively limited. The injector may be adjustable to control the quantity of heating fluid, for example be closable.

The temperature control system may be configured to heat the cavity to at least a temperature at which foamable particles fuse to form a particle foam, for example to at least a glass temperature of foamable particles.

The mould may comprise a controller configured to control the temperature control system, the filling arrangement and/or movement of the mould sections between the respective positions.

The injector may be configured to be controlled to keep a humidity in the cavity below a threshold, and/or to prevent moisture to enter the cavity before and/or after fusion, for example during heating and cooling of the mould. This way, condensation of heating fluid in the cavity, for example on inner walls of the mould sections, may be reduced or potentially avoided.

The mould further comprises a cavity seal between the first mould section and the second mould section, comprising an inner seal and an outer seal. The inner seal may be arranged towards inner walls of the mould sections, whereas the outer seal may be arranged towards outer walls of the mould sections. The inner seal may be a particle seal configured to be sealable for particles. The outer seal may be a fluid seal configured to be sealable for fluids. The inner seal and the outer seal may be arranged circumferentially around the cavity. The inner and the outer seal may be concentric with each other, but may also have different shapes.

In the closed position, the inner seal and the outer seal cooperate to block passage of particles and fluids out of the cavity. As such, passage of particles and fluids may be substantially or completely blocked, such that fusion of particle in the cavity may be performed under more desired conditions, i.e. with less or even without uncontrolled flows of particles and/or fluids into or out of the cavity. In the closed position, the cavity seal may seal the cavity to be fluid and particle tight. In the semi-closed position, the inner seal allows passage of fluids and blocks passage of particles out of the cavity. Thus, passage of particles may be substantially or completely blocked in the semi-closed position. and, for example, the cavity seal may seal the cavity to be particle tight.

In the closed position, the inner seal and the outer seal may cooperate to be particle tight and fluid tight. The term particle tight, as mentioned herein, is intended as tight for particles practically applied in the cavity for particle foam moulding, e.g. tight for foamable beads such as a thermoplastics. In an embodiment, particle tight may refer to tight for solid particles. Particle tight does not refer to fluid particles, thus not tight for the heating fluid.

The foamable particles may be foamable beads. The foamable particles may be thermoplastic particles, such as thermoplastic polymer particles.

By having the inner and outer seal, the cavity may be filled in the semi-closed position, such that filling may be carried out in a relatively large filling space so that the uniformity of the filling is potentially improved. As the outer seal is not fluid tight in the semi-closed position, the cavity may be vented via the cavity seal for movement towards the closed position. By venting the mould, pressure build-up in the cavity due to movement towards the closed position may be reduced.

By moving from the semi-closed to the closed position, particles in the cavity may be pressed against each other such that filling uniformity and/or compactness may be improved. This method of filling is referred to by the applicant as crack filling.

Furthermore, owing to the cavity seal, the cavity pressure may be controlled to be higher than an environmental pressure and/or particles may be provided at a flow rate of matter into the cavity higher than a flow rate of matter flowing out of the cavity. This way, by filling the particles at an increased pressure in the cavity, a compression of particles may be achieved. When the increased pressure in the cavity is subsequently lowered after filling, the particles may return to a less compressed form and be pressed against each other such that the filling uniformity and/or compactness may be improved.

Similarly the cavity pressure may be controlled to be lower than an environmental pressure. This way, particles may be sucked into the cavity which may promote distribution of particles through the cavity. Additionally or alternatively, the pressure in the cavity may be varied between a lower or negative pressure and a higher or overpressure.

This filling methods using negative pressure and/or over-pressure are referred to by the applicant as pressure-filling.

The benefit of the mould is that the conditions in the cavity may be controlled relatively precisely. In particular, the in- and outflow of fluids into respectively out of the cavity may be controllable. In contrast with prior art, due to the advantageous combination of a double seal and an injector, the pressure and humidity in the cavity may be controllable separately, whereby the cavity may be vented via the cavity seal. This enables crack filling and/or pressure filling of the cavity without requiring a porous wall with vapour pores or düses. This has several advantages.

First of all, the amount of heating fluid may be adjusted precisely to an amount necessary for fusion of the particles.

Secondly, the cavity may now be brought to a specific pressure that is advantageous for achieving a uniform filling, without affecting a pressure of the heating fluid accordingly.

Also, when a negative pressure would be applied in the cavity, or a pressure that is lower than a heating fluid pressure, the amount of heating fluid in the cavity may be determined by the injector, such that no heating fluid would be sucked into and/or through the cavity by a vacuum pump, as in the prior art.

Thus, a relatively low amount of heating fluid can advantageously be used in the cavity and an amount of condensate formed in the cavity may be relatively low. As a result, the mould may be particularly suited to provide a fused particle foam product that is relatively dry during fusion of the particles. As a result, the fused particle foam product may have a relatively high material quality, an improved surface quality. The fused particle foam product is sufficiently dry that the moulding process is referred to by the applicant as dry moulding. As such, the invention allows for improved filling of the cavity whereby a relatively dry final product may be obtained. In particular, the final product may have a more attractive outer appearance, be stronger and/or be more fluid tight than a fused particle foam product produced using a mould of the prior art.

Further, as heating fluid is injected into the cavity with the injector, the distribution of heating fluid into the cavity and externally therefrom may be controlled. This enables, for example, to use heating fluid in a separate heating-cooling chamber external from the cavity for heating the cavity in a different way.

By subsequent injection and evacuation of heating fluid into respectively out of the cavity, and/or by having a separate heating-cooling chamber, heating fluid may potentially be reused. As a result, less fluid, such as steam, needs to be heated such that energy consumption is reduced.

As a result, dry moulding may be performed with the mould being filled by pressure filling and/or crack filling, such that the mould potentially has a lower environmental impact, may be suited for innovative materials and/or may provide a higher material quality fused particle foam product, a drier fused particle foam product and/or a fused particle foam product having an improved surface quality.

In an embodiment, in the semi-closed position, the outer seal blocks passage of fluids into and/or out of the cavity. This way, the pressure in the cavity or cavity pressure may be controlled in the semi-closed position. As such, filling of particles may be performed by filling particles into the cavity in the semi-closed position, while applying a controlled pressure in the cavity, and pressure filling and crack filling may be combined. The mould may be fluid tight in the semi-closed position.

In an embodiment, the mould comprises an pressure control system in fluid communication with the cavity for extracting fluid from the cavity, wherein the filling arrangement is configured to feed foamable particles at a filling pressure and wherein the pressure control system is configured to influence a pressure in the cavity.

The pressure in the cavity may for example be influenced to be higher than, equal to and/or below the filling pressure when feeding foamable particles.

Due to the construction of the inner seal, fluid flow therethrough may be constricted. As such, venting of the cavity may be limited by a pressure difference between the cavity pressure and a pressure out of the outer seal, e.g. an environmental pressure. By having an pressure control system, the cavity venting may advantageously be increased. This may, for example, enable crack filling in a mould without düses as pressure increase in the cavity due to movement between the semi-closed position and the closed position may be limited by the pressure control system.

The pressure control system and or the filling arrangement may be controllable. For example, the filling arrangement may comprise a particle stock comprising particles at a filling pressure, and a valve, such that upon opening of the valve, particles are filled at the filling pressure.

This way, the cavity pressure may be controlled by varying the filling pressure and/or an extraction rate of the pressure control system to influence the pressure in the cavity.

By actively extracting fluid from the cavity, distribution of the particles through the cavity may be improved such that a better filling may be achieved.

Additionally or alternatively, the pressure control system may be configured to apply fluid in the cavity to increase the cavity pressure, for example for crack filling. In this configuration, the pressure control system may be configured to extract fluid from an external source instead of the cavity, and to apply the extracted fluid in the cavity.

In an embodiment, the inner seal and the outer seal are spaced at a distance from each other and delimit a conduit, wherein, in the semi-closed position, the outer seal blocks passage of fluids into the cavity, and wherein the pressure control system is fluidly connected to the cavity between the inner seal and the outer seal via the conduit.

The conduit may be arranged between the first mould section and the second mould section. The conduit may provide movement space for moving the mould sections between the closed and semi-closed position. The conduit may be shaped to accommodate the first mould section and/or the second mould section in the closed position thereof.

The conduit may extend between an inner end at the inner seal towards an outer end at the outer seal. The conduit may fluidly connect cavity with an outer environment, such that fluid from the cavity may be vented from the cavity towards the environment and/or fluidly connect the cavity with the pressure control system, such that fluid from the cavity may be extracted with the pressure control system.

In an embodiment, the pressure control system is separated from the temperature control system and configured to control the pressure in the cavity independently of a heating fluid pressure in the temperature control system.

This way, heating and venting of the cavity can be performed separately, such that temperature and pressure can be controlled relatively precisely.

The pressure control system and the temperature control system may be fluidly connected to the cavity via separate connections.

The inner seal and the outer seal of the cavity seal may extend around the circumference of the cavity, such that a conduit extending between the inner seal and the outer seal extends around the circumference of the cavity.

In an embodiment, between the inner seal and the outer seal, a circumferential conduit is formed around the cavity, wherein the pressure control system is fluidly connected to the cavity via the circumferential conduit. This way, extraction of fluid from the cavity may induce a flow towards the circumferential conduit. Particles filled in the cavity by the filling arrangement may be sucked through the cavity by a fluid flow induced by the pressure control system. The pressure control system may be configured to induce a fluid flow towards the inner seal.

The circumferential conduit may extend along substantially the entire cavity seal.

By having a fluid flow towards the circumference of the cavity, for example towards the inner seal, particles may spread through the cavity which may advantageously improve filling of boundary regions nearby the circumference and/or with relatively complex cavity shapes.

The pressure control system may be fluidly connected to the conduit extending around the circumference of the cavity.

In an embodiment, the temperature control system comprises a heating-cooling chamber arranged in the first mould section and/or in the second mould section adjacent to the cavity, wherein the temperature control system is configured to circulate a heating-cooling fluid through the heating-cooling chamber.

The temperature control system may comprise a hot source fluidly connectable to the heating-cooling chamber for providing hot heating-cooling fluid, such as steam, and/or a cold source fluidly connectable to the heating-cooling chamber for providing relatively cold heating-cooling fluid, such as water. This way, temperature in the cavity may be controlled by heating and/or cooling the walls of the cavity. The hot heating-cooling fluid may be the heating fluid injected with the injector, or another fluid. The hot source may, for example, provide hot heating-cooling fluid at a pressure of at least 5 bar, for example 7 bar. Hot heating-cooling fluid may be provided at a temperature of at least a glass transition temperature of the foamable particles, such that they fuse to form a particle foam, for example above 100° C., for example above 150° C.

The heating-cooling chamber may be formed by a double wall that surrounds the cavity.

By having a separate heating-cooling chamber, the cavity may be heated independently of the injection of heating fluid with the injector. As such, the mould may be heated without increasing humidity in the cavity. As such, preheating and cooling of the mould may be performed while maintaining an advantageous moisture content in the cavity.

As such, heating and cooling of the cavity may be performed in other stages of production that during fusion, for example when moving the mould sections between the closed and semi-closed and/or open position, or during filling the cavity with the filling arrangement.

Thus, a next production cycle may already be started during the open-close motion of the mould halves. This contributes to cycle time reduction.

In an embodiment, the temperature control system is configured to pre-heat the cavity before introduction of steam with the injector.

In an embodiment, the temperature control system is configured to cool the cavity during the introduction of heating fluid with the injector.

Additionally or in alternative to a heating-cooling chamber, the temperature control system may comprise other heating sources for heating the cavity, such as electric heating, induction or microwave heating, or cooling sources for cooling the cavity, such as a heat pump.

In an embodiment, the heating-cooling chamber is separated from the pressure control system such that no heating-cooling fluid is extracted by the pressure control system. This way, energy consumption of the mould is improved. For example, in the prior art, steam would be wasted through the düses.

In an embodiment, the supply of heating fluid to the at least one injector and the supply of heating fluid to the heating-cooling chamber are separated from each other. In this way, the characteristics of the heating fluid injected by the injector may be adapted for fusion, example, be hotter than heating-cooling fluid in the heating-cooling chamber.

The heating-cooling chamber may be relatively thin compared to the cavity. For example, the heating-cooling chamber may have a volume that is less than 25% of the cavity, for example less than 15%. The heating-cooling chamber may be arranged as a chamber having a relatively constant thickness around the cavity.

A heating-cooling chamber may be provided in the first mould section and a heating-cooling chamber may be provided in the second mould section. As such, substantially all walls surrounding the cavity may be heated and/or cooled.

In an embodiment, the heating-cooling system comprises a return conduit for reuse of the heating-cooling fluid. The return conduit may be fluidly connected to the hot source.

In an embodiment a wall of the first mould section and/or a wall of the second mould section adjacent to the cavity forms an essentially continuous surface that is interrupted by the filling arrangement and the at least one injector only.

Owing to the advantageous construction of the mould, having an injector, a filling arrangement and the cavity seal, further openings in the walls surrounding the cavity, for example for venting the cavity, can be omitted.

As a result, a particle foam product produced with the mould may have an improved surface quality, for example without irregularities caused by düses.

In an embodiment, a wall of the first mould section and/or a wall of the second mould section adjacent to the cavity has a thermal conductivity in the range of bronze or aluminium. This way, energy transfer from the temperature control system to the cavity may be relatively efficient. Bronze is particularly advantageous because of its relatively high heat conductivity.

The injector may comprise a valve, that may be movable between an open and a closed position. The valve may be longitudinally movable, e.g. be a piston. The injector may be configured to be controlled between an open configuration, for example an open position of the valve, wherein a heating fluid source and the cavity are fluidly connected, and a closed configurations, for example a closed position of the valve, wherein the heating fluid source and the cavity are not fluidly connected. The injector may for example be controlled electronically, hydraulically or pneumatically, for example by moving the piston, such as via application of a fluid pressure to move the piston.

The injector may be configured to inject heating fluid at a pressure higher than a pressure in the cavity, for example at least 1.5 bar, such as 1.8-2.1 bar. The heating fluid may have a temperature of at least a glass transition temperature of the foamable particles, such as a temperature of at least 100° C., for example at least 165° C. It has been found that this way, a good particle fusion may be achieved within a practical time. Preferably, the injected heating fluid may have a low vapour content. The injected fluid may comprise saturated steam or superheated steam. This way, the moisture content in the cavity may be kept relatively low.

In an embodiment, the at least one injector comprises a valve configured to be connected to a steam supply. The piston may be connected to a steam supply separate from a heating-cooling chamber.

The piston may be configured to inject a predetermined amount of heating fluid in the cavity upon activation, for example by timed activation, control using heating fluid flow sensors, etc. The piston may be activated electronically, pneumatically and/or hydraulically.

In an embodiment, the outer seal is a telescopic seal. The outer seal may comprise a telescopically movable seal, such as a piston. The telescopic seal may be configured to extend between the mould sections in the closed position, and may also be configured to extend between the mould sections in the semi-closed position.

The advantage of a telescopic seal is that compression forces may be exerted on the when the mould sections are moved towards each other, in contrast to shearing forces.

In an embodiment, the cavity seal comprises a second outer seal. The second outer seal may improve sealing of the cavity seal. For example, the outer seal may be a shear-loaded seal, whereas the second outer seal may be a compression-loaded seal. This way, sealing of the cavity in the closed position may be improved. The second outer seal may be arranged on respective sides of the first mould section and/or the second mould section that face each other. The second outer seal may be configured to be compressed in the closed position.

The invention further relates to use of a mould according to any of the embodiments described herein, for dry moulding an object from foamable particles fed into the mould by a combination of crack filling and back pressure filling.

The invention also relates to a machine comprising a mould according to any of the embodiments described herein.

This way, similar benefits as described herein for the mould may be achieved.

The invention further relates to a method for particle foam moulding, comprising the steps of filling a cavity defined by mould sections with foamable particles; moving the mould sections towards each other from a semi-closed position into a closed position, from a semi-closed position in which the mould sections are spaced further away from each other; heating the cavity and injecting an amount of heating fluid, such as steam, into the cavity for fusing the foamable particles and moving the mould sections away from each other into an open position to allow removal fused a particle foam product from the cavity.

A cavity seal may be arranged between the mould sections. The cavity seal may comprise an inner seal and an outer seal. In the closed position, the inner seal and the outer seal may cooperate to block passage of foamable particles and fluids out of the cavity, as described herein. In the seam-closed position, the inner seal may allow passage of fluids, e.g. out of the cavity, and block passage of the foamable particles, e.g. out of the cavity.

The step of filling the cavity may be performed in the semi-closed position. This way, the cavity may be crack-filled. In the closed position, the passage of particles and fluids out of the cavity may be blocked, and in the semi-closed position, the passage of fluids is allowed and the passage of particles out of the cavity is blocked.

In an embodiment, filling is performed in the semi-closed position, the passage of foamable particles and fluids out of the cavity is blocked in the closed position and the passage of fluids out of the cavity is allowed while the passage of foamable particles out of the cavity is blocked in the semi-closed position. This way, crack-filling and pressure filling may advantageously be combined for filling the cavity with particles.

In an embodiment, wherein the foamable particles are fed at a filling pressure, the method comprises the step of, when filling the cavity, extracting fluid from the cavity to influence a pressure in the cavity, for example to be equal to and/or below the filling pressure.

In an embodiment fluid is extracted from the cavity along a circumference thereof, for example via a conduit extending between an inner seal and an outer seal of the cavity.

In an embodiment, the step of heating the cavity is at least performed during the step of moving the mould sections towards each other, for example from the semi-closed position into the closed position. The heating may for example also be performed when the mould sections are moved from the open position into the semi-closed position.

In an embodiment, the step of heating the cavity is performed during the step of moving the mould sections towards each other. In particular, the cavity may be heated while no heating fluid is injected. By heating before and/or during movement of the mould sections, production speed may be relatively high.

In an embodiment, the fused particle foam product produced with the method has an essentially continuous surface that is interrupted by marks of a filling arrangement and the at least one injector only.

In an embodiment, a single fused particle foam product is produced with the mould. Due to the high energy efficiency that possible with the mould, the applicant has found it may be economically viable to produce one single piece of product with one mould, as opposed to larger quantities of products per mould, as is usually the case.

The foamable particles may comprise thermoplastics, for example polymers such as expandable polystyrene, expandable polypropylene, expandable thermoplastic polyurethane, or other materials.

In an embodiment, the method is performed using a mould according to any of the embodiments described herein, for example according to claims 1-13, and/or using a particle foam machine according to any of the embodiments described herein, for example according to claim 14.

BRIEF DESCRIPTION OF DRAWINGS

Further characteristics of the invention will be explained below, with reference to embodiments, which are displayed in the appended drawings, in which.

Throughout the figures, the same reference numerals are used to refer to corresponding components or to components that have a corresponding function.

DETAILED DESCRIPTION OF EMBODIMENTS

Figure 1:
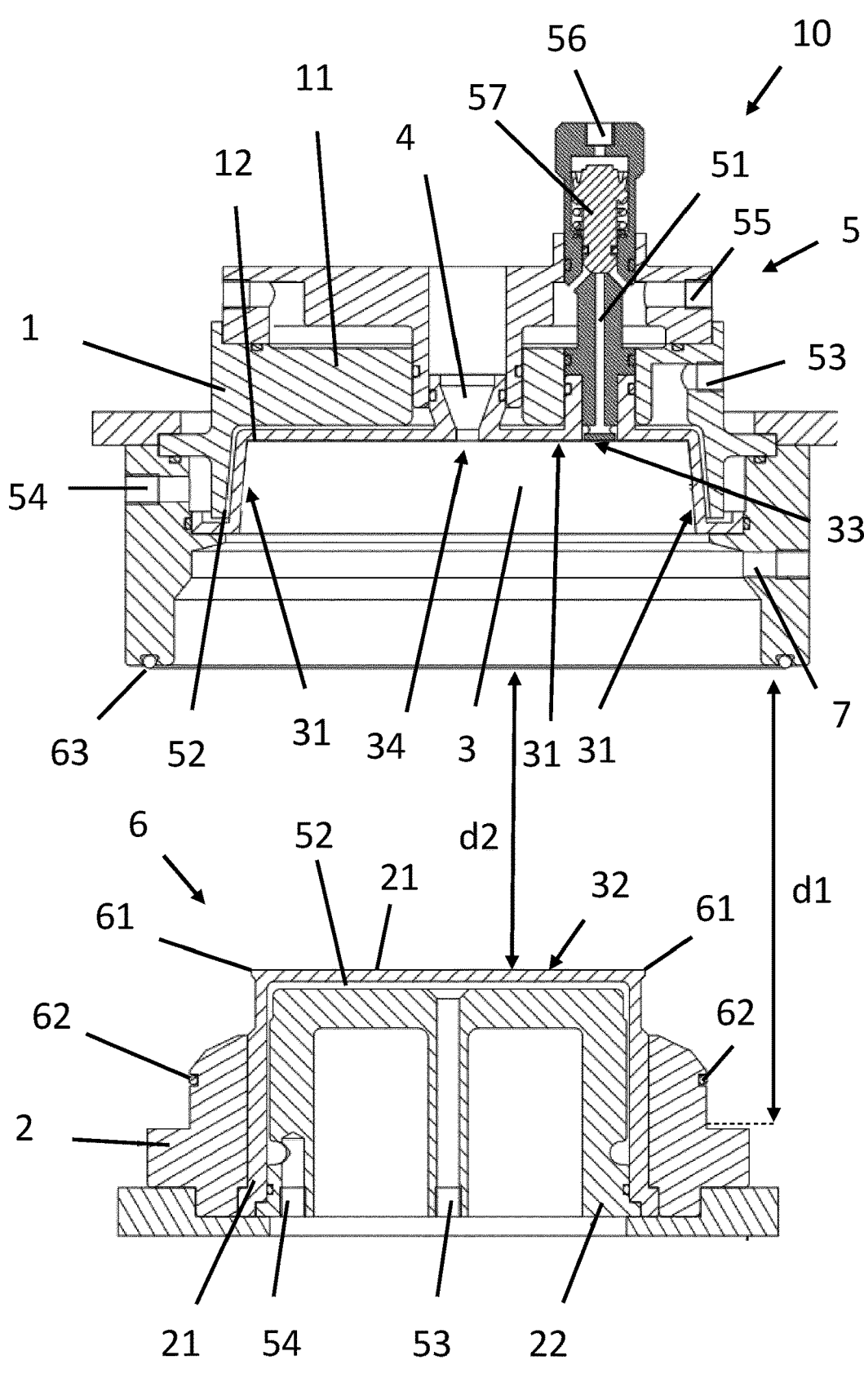
FIG. 1 schematically depicts a side view of a cross-section of an embodiment of the mould according to the present invention, wherein the mould is arranged in the open position.

FIG. 1 depicts a mould 10 for particle foam moulding. The mould 10 comprises a first mould section 1 and a second mould section 2 movable with respect to the first mould section 1. The mould sections 1, 2 are separated horizontally and are movable by means of an actuator. The first mould section 1 forms an upper section and the second mould section 2 forms a lower section. The first mould section 1 and the second mould section 2 have complementary shapes and are adapted to cooperate with each other to form the mould 10.

Figures 2A, 2B:
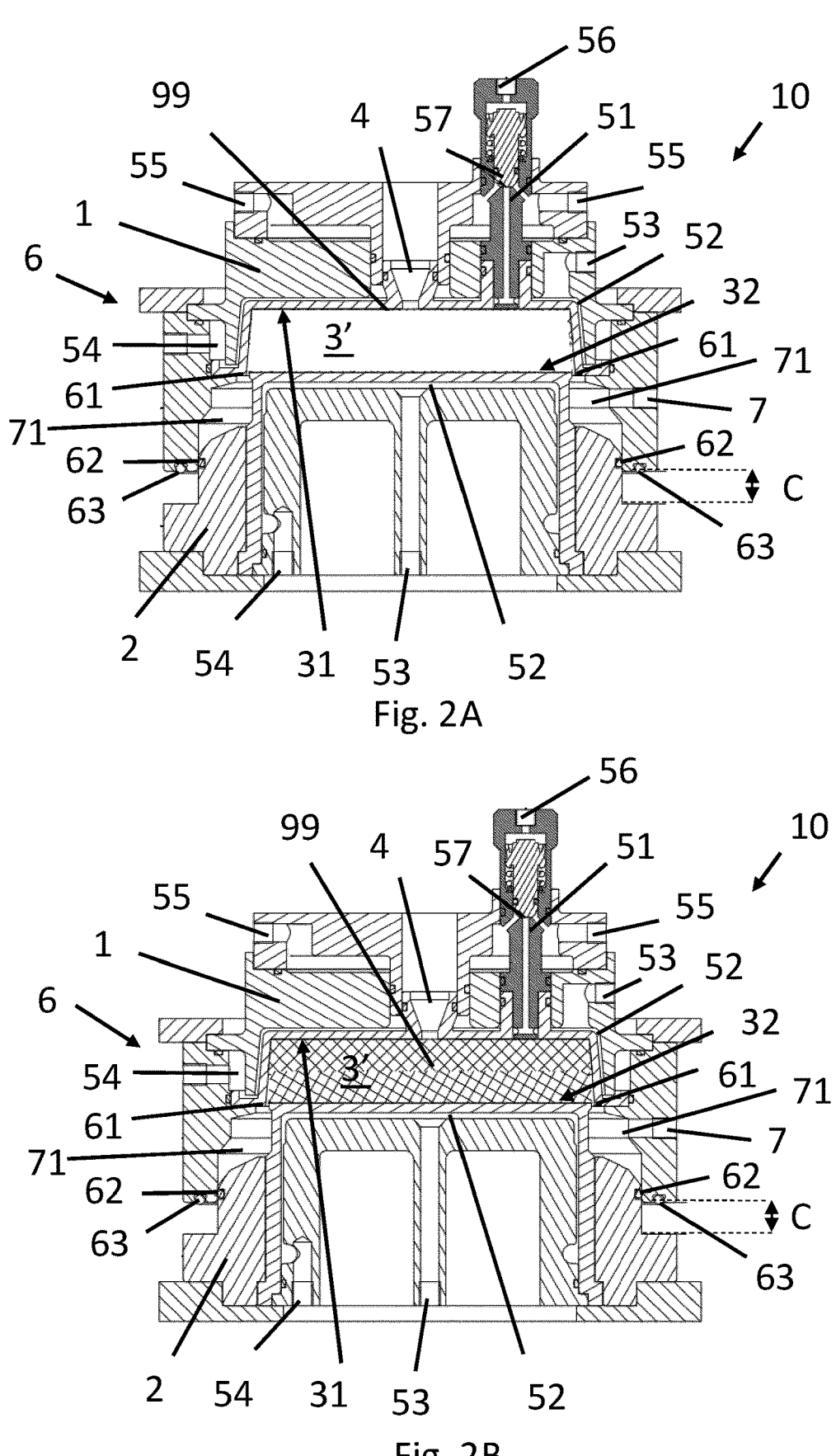
FIG. 2A schematically depicts a side view of a cross-section of the mould of FIG. 1, wherein the mould is arranged in the semi-closed position.
FIG. 2B schematically depicts a side view of a cross-section of the mould of FIG. 2A, wherein foamable particles are provided in the cavity.
Figures 2C, 2D:
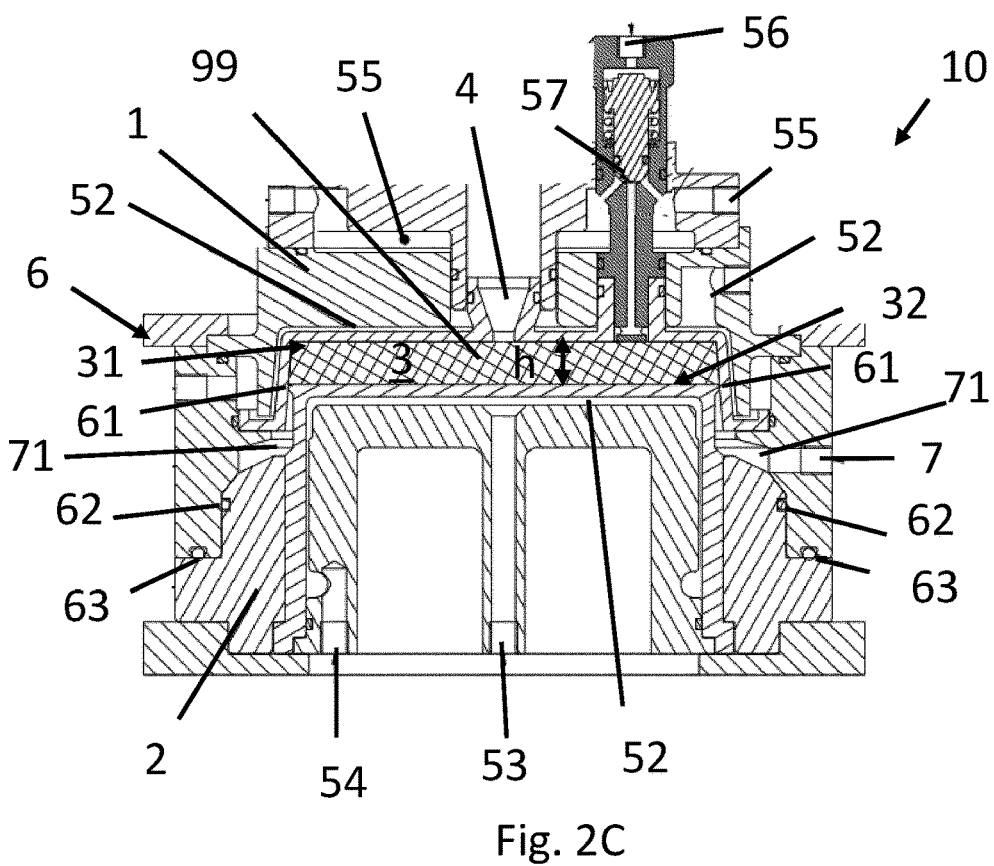
FIG. 2C schematically depicts a side view of a cross-section of the mould of FIG. 2B, wherein the mould is arranged in the closed position.
FIG. 2D schematically depicts a side view of a cross-section of the mould of FIG. 2C, wherein steam is injected by the injector.
Figure 2E:
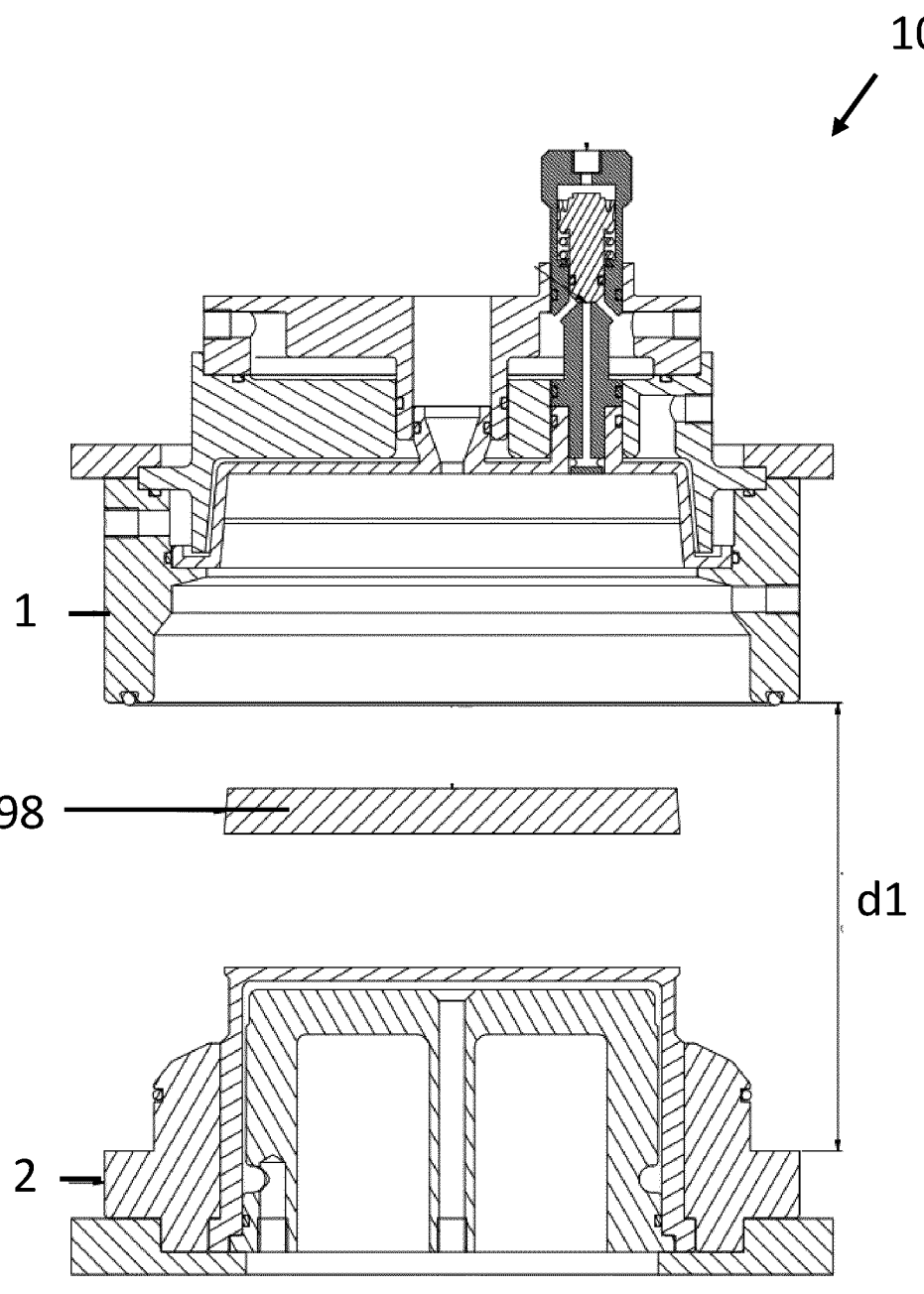
FIG. 2E schematically depicts a side view of a cross-section of the mould of FIG. 2D, wherein the mould is arranged in the open position to remove a fused particle foam product.

In the closed position of FIG. 2C-2D, the first mould section 1 and the second mould section 2 define a cavity 3. The closed position is a fusing position in which the mould sections 1,2 are arranged for fusion of foamable particles 99 in the cavity 3. The first mould section 1 comprises a recess that is closed by the second mould section 2 in the closed position to define the cavity 3. The cavity 3 is defined by inner walls 31, 32 of the mould sections 1, 2 that face each other in the closed position. The cavity 3 is completely surrounded by the first mould section 1 and the second mould section 2 in the closed position. The cavity 3 has a height h. In the closed position, the cavity 3 is shaped as a fused particle foam product 98 produced with the mould. Foamable particles 99 arranged in the cavity 3 in the closed position may form the fused particle foam product 98.

In the semi-closed position of FIG. 2A-2B, the first mould section 1 and the second mould section 2 are spaced further away from each other than in the closed position for filling the cavity 3. The first mould section 1 and the second mould section 2 are spaced at a distance C from each other of 20 mm. The semi-closed position is a filling position wherein the mould sections 1, 2 completely surround a filling space 3' which includes the cavity 3, but is larger than the cavity 3 in the closed position.

In the open position of FIG. 1, on, the first mould section 1 and the second mould section 2 are spaced at a distance d1 from each other which is larger than in the semi-closed position, to allow removal a fused particle foam product 98 from the cavity 3. The open position is a removal position in which the mould sections 1, 2 are configured to allow removal of the foamed particle product 98 from the cavity 3. A smallest distance d2 between the mould sections 1, 2, in the open position is at least the height h of the cavity in the closed position, such that a fused particle foam product 98 can be removed from the cavity 3.

The mould 10 comprises a filling arrangement 4 to feed foamable particles 99, in particular foamable beads of a thermoplastic polymer, into the cavity 3. The filling arrangement 4 is fluidly connected with the cavity 3 via filling opening 34 in inner wall 31 of the first mould section. A valve is provided between a particle stock (not shown) and the filling opening 34. The particle stock comprises pressurised air at a filling pressure and the polymer beads at the filling pressure. The valve is opened in the semi-closed position to allow for feeding by means of a fluid flow towards the cavity, such as a pneumatic fluid flow.

The mould comprises a temperature control system 5 to heat the cavity 3. The temperature control system 5 is configured to heat to inner walls 31, 32 of the first mould section 1 and the second mould section 2. The temperature control system 5 comprises at least one injector 51 configured to inject a controlled amount of heating fluid into the cavity for fusing the foamable particles 99. The injector 51 is fluidly connected to the cavity 3 via injector opening 33. The injector 51 is configured to inject heating fluid having a temperature that is equal to or higher than a temperature at which the foamable particles become deformable, i.e. mouldable. The amount of heating fluid is controlled by opening and closing the injector 51 by moving a valve 57 such that an amount of heating fluid, i.e. steam in this embodiment, may be adapted. The valve is a movable piston 57 that is moved by applying or removing a fluid pressure via control port 56.

The at least one injector 51 comprises a valve 57 configured to be connected to a steam supply via port 55. The steam supply (not shown) is separate from heating-cooling chambers 52. The piston 57 is configured to inject a predetermined amount of heating fluid in the cavity 3 upon activation by timing the activation.

In this embodiment, the valve 57 is longitudinally movable between an open position, wherein the steam supply port 55 and the cavity 3 are fluidly connected via fluid path F, and a closed position, wherein the piston 57 closes a channel between the steam supply port 55 and the cavity. The piston is biased in the open position by a spring. By application of a fluid pressure via the control port 56, the piston 57 is held in the closed position, such that upon temporary removal of the pressure via the control port 56, the piston 57 is pushed to the open position by the spring.

The mould 10 further comprises a cavity seal 6 between the first mould section 1 and the second mould section 2, comprising an inner seal 61 and an outer seal 62. The inner seal 61 is arranged towards inner walls 31, 32 of the mould sections 1, 2. The outer seal 62 is arranged towards outer walls of the mould sections 1, 2. The inner seal 61 is a particle seal configured to seal for particles. The outer seal 62 is a fluid seal configured to seal for fluids. The inner seal 61 and the outer seal 62 are arranged circumferentially around the cavity.

In the closed position, the inner seal 61 and the outer seal 62 cooperate to block passage of particles and fluids out of the cavity 3. For extra blocking, the cavity seal 6 comprises an optional second outer seal 63, which is a compression seal. The outer seal 62 comprises an o-ring. The outer seal 62 may also be arranged on the position of the second outer seal 63 and may then additionally or alternatively comprise a telescopic seal, such as a telescopic membrane.

In the closed position, the cavity seal 6 seals the cavity 3 to be fluid and particle tight. In the semi-closed position, the inner seal 61 allows passage of fluids and blocks passage of particles out of the cavity 3 (i.e. out of the filling space 3'). In the semi-closed position, the cavity seal 6 seals the cavity 3 (i.e. the filling space 3') to be particle tight. The outer seal 62 blocks passage of fluids into and/or out of the cavity 3 (i.e. the filling space 3') in the semi-closed position, such that the mould is fluid tight in the semi-closed position.

The inner seal 61 and the outer seal 62 are spaced at a distance from each other and delimit a conduit 71, wherein, in the semi-closed position, the outer seal 62 blocks passage of fluids into the cavity 3.

The conduit 71 is arranged between the first mould section 1 and the second mould section 2 and provides movement space for moving the mould sections 1,2 between the closed and semi-closed position. The conduit is shaped to accommodate movement of the first mould section 1 and the second mould section 2 towards the closed position thereof. The conduit 71 extends between an inner end at the inner seal 61 towards an outer end at the outer seal 62

The mould 10 comprises an pressure control system 7 in fluid communication with the cavity 3 for extracting fluid from the cavity 3. The filling arrangement 4 is configured to feed foamable particles 99 at a filling pressure and the pressure control system 7 is configured to influence a pressure in the cavity 3 to be equal to and/or below the filling pressure when feeding foamable particles 99. The pressure control system 7 comprises a pump (not shown) fluidly connected to the mould 10. The pressure control system 7 and the filling arrangement 4 are controllable. The cavity pressure may be controlled by varying the filling pressure and/or an extraction rate of the pressure control system 7 to influence the pressure in the cavity 3. Additionally, the pressure control system 7 is configured to apply fluid in the cavity to increase the cavity pressure, for example for crack filling. The pressure control system 7 is separated from the temperature control system 5 and configured to control the pressure in the cavity independently of a heating fluid pressure in the temperature control system 5. The pressure control system 7 and the temperature control system 5 are fluidly connected to the cavity 3 via separate connections 33, 71.

The conduit 71 fluidly connects cavity 3 with the pressure control system 7, such that fluid from the cavity may be extracted with the pressure control system. The pressure control system 7 is fluidly connected to the cavity 3 between the inner seal 61 and the outer seal 62 via the conduit 71.

The inner seal 61 and the outer seal 62 extend around the circumference of the cavity 3, such that the conduit 71 extending between the inner seal 61 and the outer seal 62 extends around the circumference of the cavity 3. The pressure control system 7 is fluidly connected to the cavity along a circumference of the cavity 3, such that extraction of fluid from the cavity induces a flow towards the circumference. Thus, the pressure control system 7 is configured to induce a fluid flow towards the inner seal 61.

The mould 10 comprises a controller configured to control the filling arrangement 4, temperature control system 5, the pressure control system 7 and the actuator to control movement of the mould sections 1, 2.

The injector 51 is configured to be controlled to keep a humidity in the cavity 3 below a threshold, and to prevent moisture to enter the cavity 3 before and/or after fusion, for example during heating and cooling of the mould 10.

The temperature control system 5 comprises two heating-cooling chambers 52, comprising a heating-cooling chamber 52 arranged in the first mould section 1 and a heating-cooling chamber 52 arranged in the second mould section 2. The heating-cooling chambers 52 are arranged adjacent to the cavity 3, and the temperature control system 5 is configured to circulate a heating-cooling fluid, such as water, through the heating-cooling chambers 52.

The temperature control system 5 comprises a hot source for providing hot heating-cooling fluid, such as steam, and a cold source for providing relatively cold heating-cooling fluid, such as water (not shown). The hot source and cold source may be controllable and fluidly connected to the heating-cooling chambers via in-outlet conduits 53, 54 in the mould sections 1,2.

The hot source may, for example, provide hot heating-cooling fluid at a pressure of at least 5 bar, for example 7 bar. Hot heating-cooling fluid may be provided at a temperature of at least a glass transition temperature of the foamable particles, such as above 100° C., for example 165° C.

The first mould section comprises two parts 11, 12 and the second mould section comprises two parts 21, 22, in between which the heating-cooling chambers 52 are arranged, such that the heating-cooling chambers 52 are formed by a double wall. The heating-cooling chambers 52 are relatively thin compared to the cavity 3 and each have a volume that is less than 25% of the cavity, in particular less than 15%. The heating-cooling chambers are arranged as chamber having a relatively constant thickness around the cavity 3.

A heating-cooling chamber 52 is provided in the first mould section 1 and a heating-cooling chamber 52 is provided in the second mould section 2. As such, substantially all walls surrounding the cavity may be heated and/or cooled.

Outlet ports 54 form a return conduit for reuse of the heating-cooling fluid. The return conduit may be fluidly connected to the hot source.

The heating-cooling chambers 52 are separated from the pressure control system 7 such that no heating-cooling fluid is extracted by the pressure control system 7. The supply of heating fluid to the at least one injector 51 is performed via steam injector port 55, and the supply of heating fluid to the heating-cooling chambers 52 is performed via conduits 53, 54, thus the supplies are separated from each other. The first conduit 53 serves as inlet conduit and the second conduit 54 serves as outlet conduit, or vice versa. The characteristics of the heating fluid injected by the injector 51 are be adapted for fusion, example, be hotter than heating-cooling fluid in the heating-cooling chambers 52.

The temperature control system 5 is configured to pre-heat to heat the cavity 3 before introduction of steam with the injector 51, and to cool the cavity 3 during the introduction of heating fluid with the injector 51.

The inner walls 31, 32 a wall of the first mould section 1 and the second mould section 2 adjacent to the cavity 3 form an essentially continuous surface that is interrupted by the filling arrangement 7 and the at least one injector 51 only. The parts 12, 21 of the first mould section 1 and the second mould section 2 adjacent to the cavity forming the inner walls 31, 32 have a thermal conductivity of bronze.

In use, the mould section 1, 2 are first positioned in the semi-closed position. The cavity 3 is then filled with foamable particles 99, for example expandable thermoplastic polyurethane particles, at a filling pressure via the filling arrangement 4. Meanwhile, the cavity 3 may be held at a predetermined pressure different from the environmental pressure and different from the filling pressure via the pressure control system 7, connected along the circumference of the cavity 3 to introduce a fluid flow through the cavity 3 to improve filling of the cavity 3. Further, during filling, the inner walls 31, 32 of the cavity 3 are already heated via heating-cooling chambers 52, by pumping heating fluid from a hot source therethrough, without moisture entering the cavity 3. Heating fluid is circulated and reused after reheating by the hot source. No heating fluid is injected into the cavity 3.

The mould sections 1, 2 are then moved towards into the closed position. This way, the particles 99 are compressed and crack filling (by movement from the semi-closed to the closed position after filling the cavity) and pressure filling (by maintaining the cavity at a predetermined pressure with the pressure control system 7) are combined. Instead of a combination of filling in the semi-closed position, the cavity 3 may be filled in the closed position.

Then, a controlled amount of steam is injected into the cavity 3 by the injector 51 via fluid path F, at a pressure higher than a pressure in the cavity, for example 1.8-2.1 bar and at a temperature higher than a temperature at which the foamable particles become deformable, i.e. mouldable. The valve 57 is briefly moved to the open position by the controller by a temporary removal of a continuous fluid pressure at the control port 56 to fluidly connect the steam supply port 55 to the cavity 3.

Then, water is pumped through the heating-cooling chambers 52 to cool the inner walls 31, 32 of the cavity. During cooling, the mould sections 1,2 are moved towards the open position for removing fused a particle foam product 99 from the cavity 3.

As explained hereinabove, the inner walls 31, 32 were heated before injection of steam in the cavity 3 resulting in relatively little condensate or no condensate in the cavity during fusion of the foamable particles 99. Further, before and after fusion, for example during heating and cooling of the mould 10, no moisture entered the cavity 3. As a result, the fused particle foam product 99 has an essentially continuous surface that is interrupted by marks of the filling arrangement 4 and the at least one injector 51 only.

The invention claimed is:

1. A mould for particle foam moulding, for example dry moulding, comprising:
   a first mould section;
   a second mould section movable with respect to the first mould section, between:
      a closed position, in which the first mould section and the second mould section define a cavity;
      a semi-closed position, in which the first mould section and the second mould section are spaced further away from each other than in the closed position for filling the cavity; and
      an open position, in which the first mould section and the second mould section are spaced at a distance from each other to allow removal of a fused particle foam product from the cavity;
   a filling arrangement to feed foamable particles into the cavity in the semi-closed position;
      a temperature control system to heat the cavity, wherein the temperature control system comprises at least one injector configured to inject a controlled amount of heating fluid, such as steam, into the cavity for fusing the foamable particles; and
   a cavity seal between the first mould section and the second mould section, comprising an inner seal and an outer seal, wherein, in the closed position, the inner seal and the outer seal cooperate to block passage of foamable particles and fluids out of the cavity, and in the semi-closed position, the inner seal allows passage of fluids and blocks passage of foamable particles out of the cavity.

2. The mould according to claim 1, wherein, in the semi-closed position, the outer seal blocks passage of fluids into and/or out of the cavity.

3. The mould according to claim 1, further comprising a pressure control system in fluid communication with the cavity for extracting fluid from the cavity, wherein the filling arrangement is configured to feed foamable particles at a filling pressure and wherein the pressure control system is configured to influence a pressure in the cavity.

4. The mould according to claim 2, wherein the inner seal and the outer seal are spaced at a distance from each other and delimit a conduit, wherein, in the semi-closed position, the outer seal blocks passage of fluids into the cavity, and wherein the pressure control system is fluidly connected to the cavity between the inner seal and the outer seal via the conduit.

5. The mould according to claim 3, wherein the pressure control system is separated from the temperature control system and configured to control the pressure in the cavity independently of a heating fluid pressure in the temperature control system.

6. The mould according to claim 3, wherein between the inner seal and the outer seal a circumferential conduit is formed around the cavity, and wherein the pressure control system is fluidly connected to the cavity via the circumferential conduit.

7. The mould according to claim 1, wherein the temperature control system further comprises a heating-cooling chamber arranged in the first mould section and/or in the second mould section adjacent to the cavity, wherein the temperature control system is configured to circulate a heating-cooling fluid through the heating-cooling chamber.

8. The mould according to claim 7, wherein the heating-cooling chamber is separated from the pressure control system such that no heating-cooling fluid is extracted by the pressure control system.

9. The mould according to claim 7, wherein the supply of heating fluid to the at least one injector and the supply of heating fluid to the heating-cooling chamber are separated from each other, and wherein the heating-cooling chamber comprises a return conduit for reuse of the heating-cooling fluid.

10. The mould according to claim 1, wherein a wall of the first mould section and/or a wall of the second mould section adjacent to the cavity forms an essentially continuous surface that is interrupted by the filling arrangement and the at least one injector only.

11. The mould according to claim 1, wherein a wall of the first mould section and/or a wall of the second mould section adjacent to the cavity has a thermal conductivity in the range of bronze or aluminium.

12. The mould according to claim 1, wherein the at least one injector comprises a valve configured to be connected to an external fluid supply.

13. The mould according to claim 1, wherein the outer seal is a telescopic seal.

14. A use of a mould according to claim 1 for dry moulding an object from foamable particles fed into the mould by a combination of crack filling and back pressure filling.

15. A particle foam machine comprising a mould according to claim 1.

16. A method for particle foam moulding, comprising the steps of:
   filling a cavity, defined by mould sections, with foamable particles;
   moving the mould sections towards each other from a semi-closed position into a closed position;
   heating the cavity and injecting an amount of heating fluid, such as steam, into the cavity for fusing the foamable particles;
   moving the mould sections away from each other into an open position for removal of a fused particle foam product from the cavity;
   wherein a cavity seal is arranged between the mould sections, comprising an inner seal and an outer seal, wherein, in the closed position, the inner seal and the outer seal cooperate to block passage of foamable particles and fluids out of the cavity, and in the semi-closed position, the inner seal allows passage of fluids and blocks passage of the foamable particles out of the cavity.

17. The method according to claim 16, wherein the foamable particles are fed at a filling pressure, further comprising the step of, when filling the cavity, extracting fluid from the cavity to influence a pressure in the cavity.

18. The method according to claim 17, wherein fluid is extracted from the cavity along a circumference thereof.

19. The method according to claim 16, wherein the step of heating the cavity is at least performed during the step of moving the mould sections towards each other from the semi-closed position into the closed position.

20. The method according to claim 16, wherein the fused particle foam product has an essentially continuous surface that is interrupted by marks of a filling arrangement and the at least one injector only.

21. The method according to claim 16, further comprising the step of providing a mould for particle foam moulding, the mould comprising:

a first mould section;

a second mould section movable with respect to the first mould section, between:

a closed position, in which the first mould section and the second mould section define a cavity;

a semi-closed position, in which the first mould section and the second mould section are spaced further away from each other than in the closed position for filling the cavity; and an open position, in which the first mould section and the second mould section are spaced at a distance from each other to allow removal of a fused particle foam product from the cavity;

a filling arrangement to feed foamable particles into the cavity in the semi-closed position;

a temperature control system to heat the cavity, wherein the temperature control system comprises at least one injector configured to inject a controlled amount of heating fluid, such as steam, into the cavity for fusing the foamable particles;

wherein the first mould section and the second mould section form the respective mould sections, and wherein the method is carried out with the provided mould.

\* \* \* \* \*